United States Patent [19]
Boudigues

[11] 3,968,647
[45] July 13, 1976

[54] MULTIFLOW GAS TURBINE POWER PLANT

[75] Inventor: Serge Boudigues, Bagneux, France

[73] Assignee: Societe Nationale d'Etude et de Construction de Moteurs d'Aviation, Paris, France

[22] Filed: May 7, 1974

[21] Appl. No.: 467,793

[30] Foreign Application Priority Data
May 8, 1973 France .................... 73.16471

[52] U.S. Cl. ..................... 60/262; 60/269; 60/39.41; 415/77
[51] Int. Cl.² ............... F02C 3/06; F02K 3/04
[58] Field of Search ............ 60/262, 269, 39.41; 415/77, 78, 116

[56] References Cited
UNITED STATES PATENTS

| | | | |
|---|---|---|---|
| 2,623,356 | 12/1952 | Coanda | 60/262 |
| 3,368,352 | 2/1968 | Hewson | 60/262 |
| 3,377,804 | 4/1968 | Wright et al. | 60/262 |
| 3,677,012 | 7/1972 | Batscha | 60/262 |

Primary Examiner—C. J. Husar
Assistant Examiner—Robert E. Garrett
Attorney, Agent, or Firm—William J. Daniel

[57] ABSTRACT

A dual-flow or multiflow gas turbine power plant comprising a jet pipe, at least two separate flow-ducts each opening into the jet pipe, namely a first flow-ducts through which passes, in operation, a first gas flow and which contains a gas generator of the gas turbine type and an expansion-turbine located downstream of the gas generator, and a second flow-ducts through which passes, in operation, a second gas flow and a mixer device in which the first gas flow leaving the expansion turbine, and the second gas flow, are arranged to be mixed prior to entering the jet pipe, the plant further comprising a recompressor located downstream of the mixer device, in which the mixture of the two gas flows is arranged to be recompressed before entering the jet pipe.

5 Claims, 8 Drawing Figures

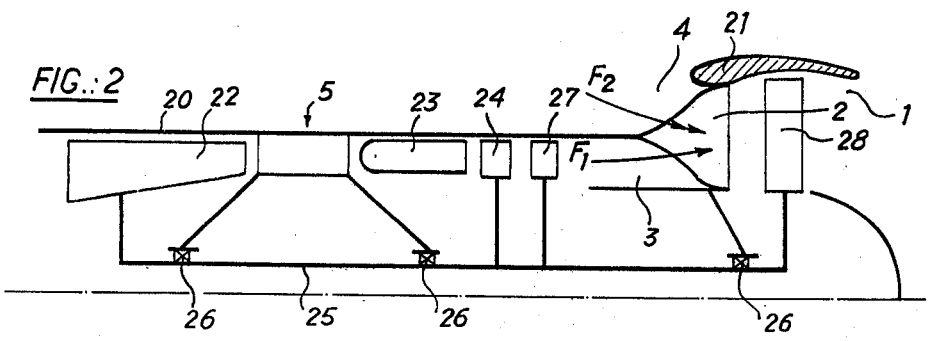
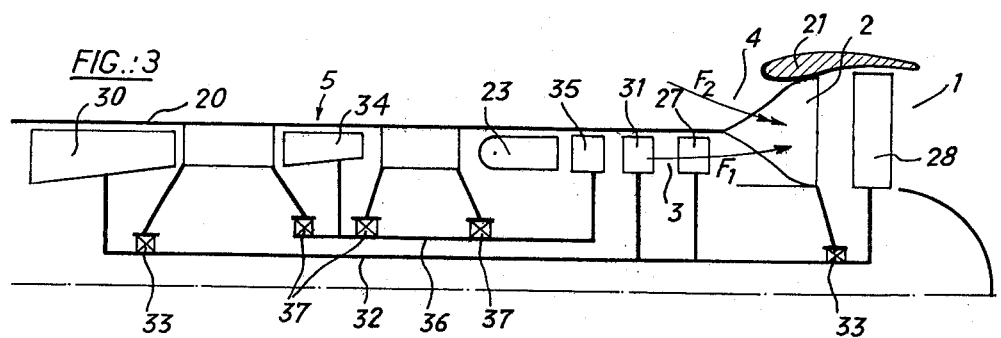
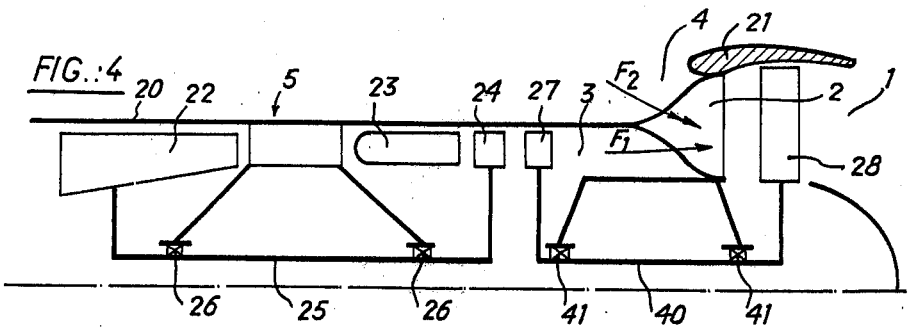
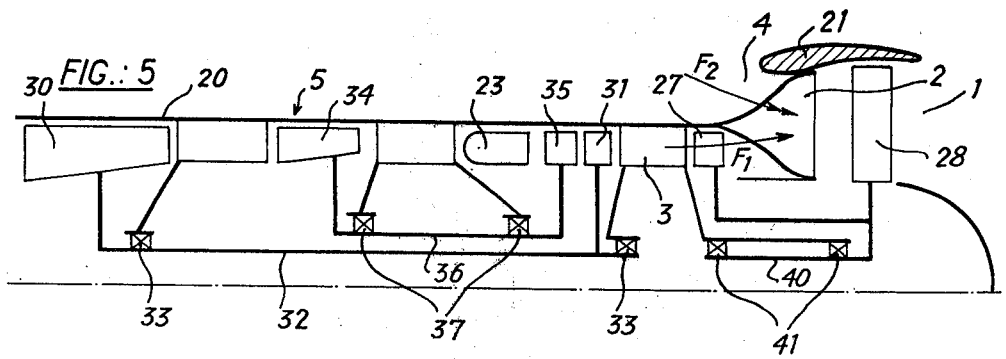

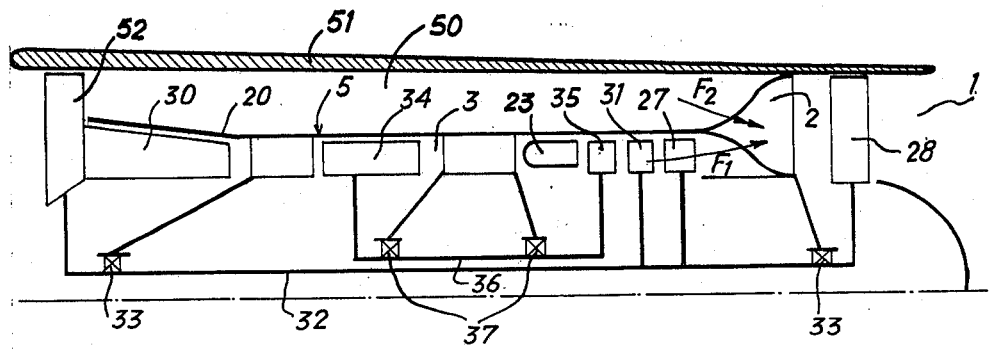
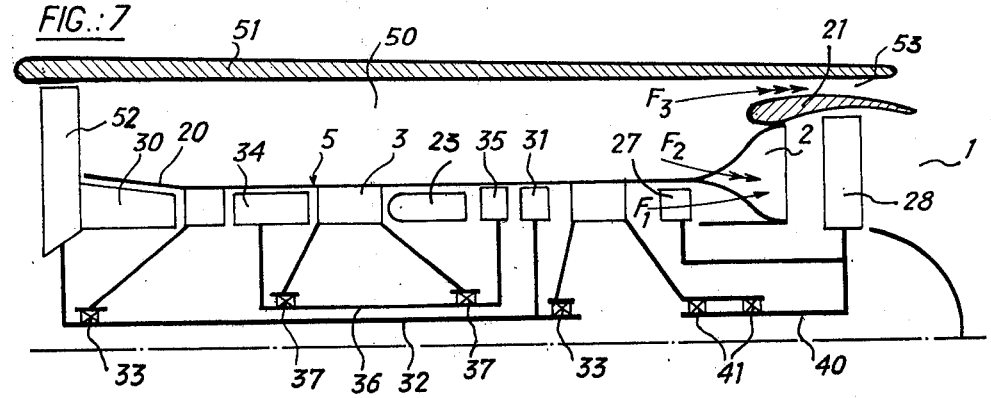
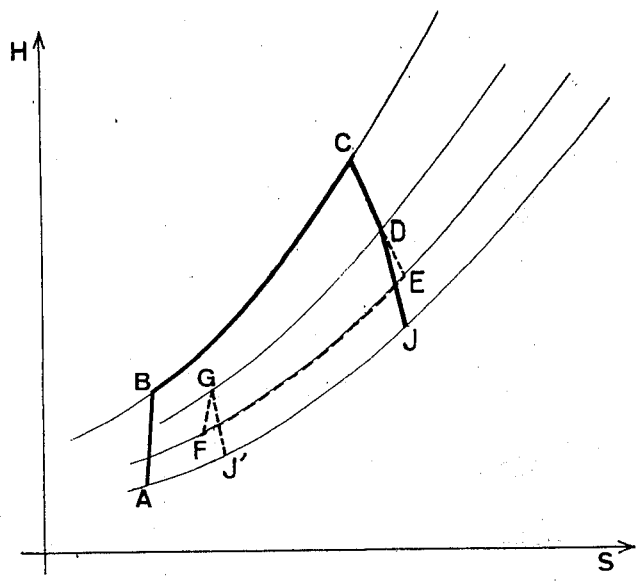

MULTIFLOW GAS TURBINE POWER PLANT

BACKGROUND OF THE INVENTION

The present invention relates to a multi-flow, for example, a dual flow gas turbine power plant.

It relates, more particularly, to a power plant such as a turbojet engine, of the kind comprising, in combination, a jet pipe, at least two separate flow-ducts, each opening into said jet pipe, namely a first or primary flow-duct through which passes, in operation a first gas flow or primary and in which there are arranged a gas generator of the gas turbine type and an expansion turbine arranged down-stream of said gas generator, and a second or secondary flow-duct through which passes, in operation, a second or secondary gas flow, and a mixer device in which the first gas flow leaving the expansion turbine, and the second gas flow, are arranged to mix with one another before entering the jet pipe.

This plant possesses numerous advantages which will be discussed later, in particular advantages of performance (pressure and specific consumption) size, adaptability to an existing gas generator, and reduction of noise in operation.

SUMMARY OF THE INVENTION

In accordance with the invention, a gas turbine power plant of the aforesaid type comprises, furthermore, a recompressor arranged downstream of said mixer device, in which the mixture of said two gas flows is arranged to be recompressed prior to entering the jet pipe.

The expansion turbine can advantageously be designed to subject the first gas flow to a super expansion down to a pressure equal to that of the second gas flow at the time of entry of the latter to the mixer device.

The second flow entering the mixer device, may be constituted, for example, by a secondary airflow at the dynamic flight pressure, directly drawn from the surrounding atmosphere, or again by a secondary airflow which has undergone previous mechanical compression, for example in a fan.

In accordance with an embodiment which is applicable to the case where the gas generator is of single-rotating spool kind, the recompressor and the expansion turbine may be mechanically connected to said spool.

In accordance with another embodiment applicable to the case where the gas generator is of the kind having at least two rotating spool, namely a low-pressure spool and a high-pressure spool, the recompressor and the expansion turbine may be mechanically connected with the said low-pressure spool.

In accordance with another embodiment, the recompressor is driven by the expansion turbine and constitutes in association therewith a rotating spool which is independent of the rotating spool or spools of the gas generator.

BRIEF DESCRIPTION OF THE DRAWINGS

The invention will now be further described, by way of example, with reference to the accompanying drawings, in which:

FIGS. 2 to 7 are schematic views in axial half-section, each illustrating an embodiment of a dual-flow or multiflow gas turbine power plant in accordance with the invention, and FIG. 8 is a diagram illustrating one of the advantages secured by the invention.

DESCRIPTION OF PREFERRED EMBODIMENTS

Figure 1:
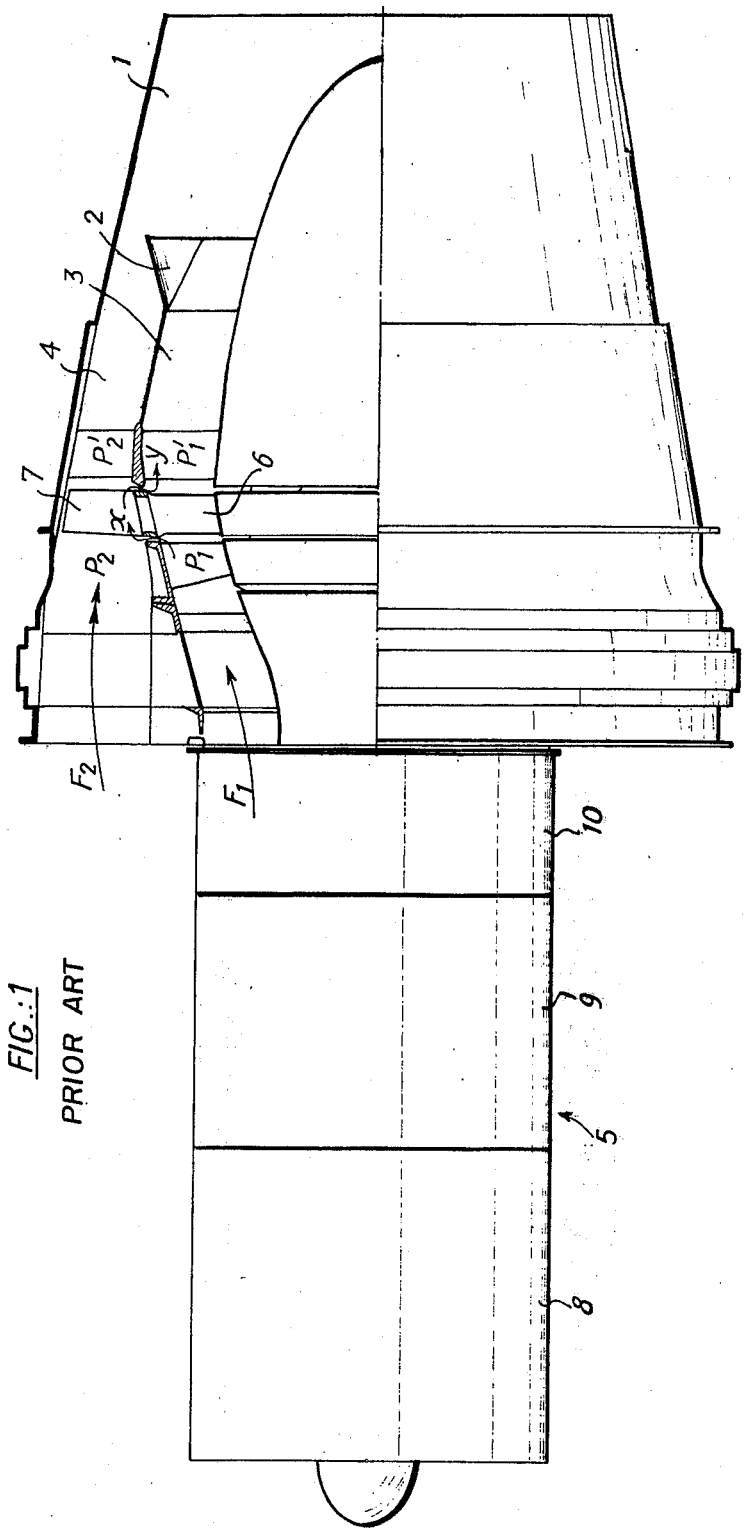
FIG. 1 is a schematic view, in partial axial section, through a dual mixed flow gas turbine power plant of known type.

In FIG. 1, a known type of gas turbine power plant has been illustrated, which comprises a jet pipe 1 into which there open, via a mixer device 2, two separate coaxial ducts, namely a first or primary duct 3 and a second or secondary or dilution duct 4. The primary duct 3 contains a gas generator 5 and an expansion turbine 6. The secondary passage 4 contains a rear fan 7, the moving blading of which is fixed to the moving blading of the expansion turbine 6 and is disposed in radial extension of said latter blading. The gas generator 5 is of the gas turbine type and itself comprises a compressor 8, a combustion chamber 9 and a turbine 10 used to drive a compressor 8.

In operation, the primary duct 3 passes a first or primary gas flow $F_1$ constituted by hot gases coming from the gas generator 5 and then flowing through the expansion turbine 6, whilst the secondary passage 4 passes a second or secondary gas flow $F_2$ constituted by a flow of compressed fresh air, the compression taking place when the air passes across the fan 7. The two flows $F_1$ and $F_2$ unite in the mixer 2, before flowing together into the jet pipe 1.

This known plant has a number of drawbacks associated with the use of a "double" moving blading system, a part 6 of which rotates in the primary duct 3 through which the hot gas flow $F_1$ passes, and another part 7 of which rotates in the secondary passage 4 through which the fresh air flow $F_2$ passes. Upstream of this blading, the pressure $P_1$ of the hot gases is higher than the pressure $P_2$ of the fresh air. Consequently, in the neighbourhood of the leading edges of said blading system, a leakage flow (indicated by the arrow X) of hot gases develops between the primary duct 3 and the secondary duct 4. The result is not only losses, but a serious disturbance in the air flow across the fan 7. Similarly, downstream of the double blading system, 6, 7, the pressure $P'_2$ of the compressed fresh air may be higher than the pressure $P'_1$ of the expanded hot gases. Consequently, a leakage flow may develop (indicated by the arrow y) of fresh air between the secondary duct 4 and the primary duct 3, giving rise to additional losses.

Consequently, the assembly constituted by the expansion turbine 6 and the fan 7, has a mediocre overall efficiency. In addition the aforesaid leakage, which is already substantial in the case of a single-stage fan, becomes prohibitive in the case of a multi-stage fan. In practice, therefore, the number of stages of the fan has to be limited and, consequently, also the fan compression ratio.

In addition, the use of dual moving blading 6, 7, over part of the height of which a hot gas flow passes whilst over another part of its height a fresh air flow is passing, gives rise to intricate problems due to thermal stress.

The present invention makes it possible to overcome these drawbacks by the use of a special arrangement which will now be described with reference to FIGS. 2 to 8.

FIG. 2 illustrates a first embodiment of the invention. In this figure, the first or primary flow-duct 3, through which passes the first or primary gas flow $F_1$, and the second or secondary flow-duct 4, through which passes the second or secondary gas flow $F_2$, can be seen. The primary duct 3 is externally delimited by a casing 20 which acts at the same time as the fixed structure of the plant. Between this casing 20 and a fairing 21, the mixer device 2 is arranged, wherein the two flows $F_1$ and $F_2$ reunite before entering the jet pipe 1.

The mixer device 2 is of a type known per se, comprising means for increasing the area of contact between the two flows being mixed, and for causing said two flows furthermore to meet at a certain angle so that the resultant mixed flow is thoroughly homogeneous. In the example illustrated, the mixer device comprises an undulating structure defining a plurality of adjacent passages each of which passes a thin stream of one or the other of the two flows.

The first gas flow $F_1$ is constituted by a flow of hot gases emitted by the gas generator 5. The latter comprises a compressor 22, a combustion chamber 23 and a turbine 24 which drives the compressor 22. The gas generator 5, in the example illustrated, is of the single-spool kind, that it to say that the rotor of the compressor 22 and that of the turbine 24 are attached for rotation, to a same shaft 25 carried in bearings 26 assembled in the fixed structure 20.

The second gas flow is constituted by a fresh air flow which is drawn from the surrounding atmosphere at the dynamic flight pressure and which penetrates directly, without prior mechanical compression, into the mixer device 2.

Downstream of the gas generator 5, there is an expansion turbine 27 secured for rotation to the spool 22, 24, 25 of the gas generator 5, and designed to super-expand the first gas flow $F_1$ down to a pressure equal to that of the second gas flow $F_2$ at the time of the latter's entry into the mixer device 2. Downstream of the mixer device there is a recompressor 28, likewise secured for rotation to the spool 22, 24, 25 of the gas generator 5. The recompressor 28 has been shown as having only a single compression stage but it could equally well have two or more.

In operation, the first or primary gas flow $F_1$ leaving the expansion turbine 27 and the second or secondary gas flow $F_2$ which is at the dynamic flight pressure, reunite, at their common pressure, in the mixer device 2. The tepid mixture of the two gas flows is then recompressed in the recompressor 28 before entering the jet pipe 1.

It will be observed that in the installation which has just been described, the problem of leakages of fluid from one flow-duct to the other (a problem which has been referred to earlier in respect of FIG. 1) no longer arises so that the drawbacks associated with this kind of leakage are eliminated as well. This plant, therefore has the advantage of making it possible to us a multi-stage recompressor and therefore to improve the compression ratio achieved by the latter.

Another advantage of the plant in accordance with the invention resides in the fact that the blading of the recompressor 28, over its full height, is passing a tepid gas flow at a substantially uniform temperature. This blading, which for example, may be made of titanium, therefore poses no particular problem as far as thermal stress is concerned, quite unlike the case with the dual blading 6, 7, shown in FIG. 1.

Another advantage of this plant is in performance (thrust and specific fuel consumption) in comparison with conventional plants.

This gain will be understood from a consideration of FIG. 8, which, on an entropy (S) - enthapy (H), chart, illustrates the thermodynamic cycle of a conventional plant and that of a plant in accordance with the invention. It will be observed that on this chart, the isobars are divergent, that is to say if we consider two neighbouring isobars, the difference between the ordinates for two points of identical abscissa, on these isobars, increases as the abscissa value increases.

The thermodynamic cycle in a conventional plant is as follows: compression AB, constant pressure combustion BC, expansion CD (where $H_C - H_D = H_B - H_A$), exhaust DJ.

In the plant in accordance with the invention, the gases successively, commencing from the point D, undergo super-expansion DE, cooling by mixing at constant pressure EF, recompression FG, and exhaust GJ'.

Since the isobars diverge, the work of recompression $(H_G-H_F)$, of the cooled gases, is less than the work of super-expansion $(H_D-H_E)$ of the hot gases. Accordingly, an improvement in thermal efficiency is achieved. In addition, exhaust takes place at a temperature $T_j$ which is lower than the exhaust temperature $T_j$ in a conventional plant,; thus, there is an improvement in propulsion efficiency. Ultimately, therefore, the improvements in efficiency are translated by a gain in thrust and a gain in specific fuel consumption. The gain may reach and with respect to fact exceed 6% in a plant in which the same secondary air flow is compressed at the same pressure, but prior to mixing with the hot gases.

Another advantage of the plant in accordance with the invention is that it can readily be built by the addition to a basic single-flow engine, of an assembly comprising a super-expansion turbine and a recompressor, this without any need to interfere with the tuning of the basic engine.

Another advantage of the plant in accordance with the invention is that it achieves a substantial reduction in the noise due to the overall reduction in the velocity of the mixture of the two flows $F_1$ and $F_2$, leaving the jet pipe 1.

FIG. 3 illustrates a second embodiment of the invention, applicable to the case where the gas generator 5 is of the dual-spool type, namely a high pressure spool and a low pressure spool. The low-pressure spool comprises a low-pressure compressor 30 and a low-pressure turbine 31 whose respective rotors are secured for rotation to one and the same shafts 32 carried in bearings 33 assembled in the fixed structure 20. The high pressure spool comprises a high pressure compressor 34 and a high pressure turbine 35, the respect rotors of which are secured for rotation to the same shaft 36 carried in bearings 37 assembled in the fixed structure 20. In accordance with a feature of the invention which is applicable to this case, the respective rotors of the super-expansion turbine 27 and of the recompressor 28, are mechanically attached to the aforementioned low-pressure spool 30, 31, 32.

FIG. 4 illustrates a third embodiment of the invention, in accordance with which the respective rotors of the super-expansion turbine 27 and the recompressor 28, are secured for rotation of the same shaft 40 carried in bearings 41 assembled in the fixed structure 20. This embodiment differs from that shown in FIG. 2, simply by the fact that the super-expansion turbine 27 and the recompressor 28 together constitute a spool 27, 28, 40 which is independent of that 22, 24, 25 of the gas generator 5.

FIG. 5 illustrates a variant of the preceding embodiment, applicable to the case where the gas generator 5 is of the dual-spool kind, namely a low-pressure spool 30, 31, 32, and a high-pressure spool 34, 35, 36.

FIG. 6 illustrates a fourth embodiment of the invention, in accordance with which the second gas flow $F_2$ is constituted by a fresh air flow which has undergone previous mechanical compression prior to entering the mixer device 2. The previously compressed fresh air flow passes through a by-pass duct 50 surrounding the gas generator 5 and delimited externally by a fairing 51.

The gas generator 5 being of the dual-spool type for example, as described in relation to FIG. 3, the prior mechanical compression of the air flow passing through the by-pass duct 50 can be achieved, for example, by the use of an upstream fan 52 mechanically connected to the low-pressure spool 30, 31, 32.

In this embodiment, the super-expansion turbine 27 and the recompressor 28 are likewise connected to the low-pressure spool 30, 31, 32.

Thus, a dual-flow propulsion plant is created, in which the jet pipe 1 passes the mixture of the two gas flows $F_1$ and $F_2$ which have been combined before passing together through the recompressor 28.

At this point it should be stated that if, in a dual-flow (or multiflow) turbojet engine, we call $q$ the compressed gas flow rate through the main combustion chamber 23, and "Q" the compressed gas flow rate not passing through said combustion chamber, then the by-pass or dilution ratio of the turbojet engine is given by $\lambda = Q/q$.

It should be remembered, too, that it is generally desirable, in order to increase the propulsive efficiency of this kind of jet engine, to increase the dilution ratio $\lambda$. Consequently, currently dilution ratios $\lambda$ of the order of 6 or 7 are being achieved.

However, the peripheral velocity of the fan must, for reasons of aerodynamic behaviour and noise reduction, be kept down to a relatively low value, equal to or less than 450 m/s. The result is that the flow rate Q of the "cold" gas is also limited and that in order to improve the dilution ratio $\lambda$ beyond a certain limit, there is virtually no recourse left other than to reduce the flow rate q of the "hot" gas flow.

In order to drive the fan, therefore, a low pressure turbine must be used, the diameter of which is small compared with that of the fan. The linear velocity of a blading stage in the low-pressure turbine, is therefore reduced and consequently, this stage does not produce a great deal of work. Since the dilution ratio $\lambda$ is high, the fan drive requires a substantial amount of work, and therefore a large number of stages on the part of the low-pressure turbine connected to the fan.

One drawback of conventional plants with a high dilution ratio, therefore resides in the fact that they need a large number of low-pressure turbine stages.

Another drawback of conventional plants having high dilution ratios, in the case where they employ a dual-spool gas generator with compressor stages connected to the fan stage, resides in the fact that the compressor stages are rotating too slowly and therefore provide only limited compression ratios.

Another drawback of conventional plants with high dilution ratios, resides in the fact that they have a relatively large mid-diameter due to the large diameter which the fan requires.

The present invention, as described in relation to FIG. 6, makes it possible to substantially reduce the drawbacks hereinbefore referred to.

In other words, because of the gain in propulsion efficiency associated with the use of the recompressor 28, it is possible to reduce the dilution ratio of the plant, from for example $\lambda = 7$ to $\lambda = 4$, whilst preserving a satisfactory overall efficiency.

If this is done, then the following advantages are achieved:

There is a reduction in the number of stages in the low-pressure turbine and in the low-pressure compressor of the gas generator: In other words, because of the smaller dilution ratio, the expansion and compression stages rotate faster and therefore produce (turbine) or absorb (compressor) more work;

there is a reduction in the centre or midship diameter of the plant, substantially in the ratio $\sqrt{4+1/7+1} = 0.79$;

there is a reduction in the noise generated by the fan.

FIG. 7 illustrates a variant of the embodiment shown in FIG. 6, applicable to the case where the super-expansion turbine 27 and the recompressor 28 together form a spool 27, 28, 40 independent of the spool or spool of the gas generator 5. In the case of the figure, the fairing 51, in association with that 21, defines a tertiary passage 53 surrounding the mixer device 2 and the recompressor 28. Through this tertiary passage, a fraction $F_3$ of the air flow passing through the bypass passage 50, can be discharged directly without passing through the mixer device 2 and the recompressor 28. In this way, a triple-flow propulsion plant is created.

It goes without saying that the embodiments described are purely examples and are open to modification, in particular by the substitution of equivalent techniques, without in so doing departing from the scope of the invention.

What is claimed is:

1. A dual-flow gas-turbine jet propulsion engine of the kind subdivided into a primary duct and a secondary duct traversed in operation respectively by a primary gas flow and by a secondary air flow, comprising in combination (i) a fore unit which comprises:
   a. a gas generator of the internal-combustion gas-turbine type including compressor means, combustion means and turbine means mounted in series flow arrangement in said primary duct, said gas generator being designed to deliver a gas flow at a first pressure, and
   b. mechanical compression means extending in said secondary duct for compressing said secondary air flow to a second pressure lower than said first pressure; and (ii) an aft unit which comprises:
   c. a super-expansion turbine separate and distinct from said turbine means and located in said primary duct downstream of said turbine means to receive the gas flow from said gas generator, said super-expansion turbine being designed to super-expand said gas flow from said first pressure down to a third pressure substantially equal to said second pressure of said secondary air flow,
   d. flow-mixer means communicating both with said primary duct downstream of said super-expansion turbine and with said secondary duct downstream of said mechanical compression means, for intermingling gas at said third pressure issuing from said super-expansion turbine with air at said second pressure issuing from said mechanical compression means, to deliver a gaseous mixture of said gas and said air, e. a recompressor arranged downstream of said flow-mixer means to be supplied in operation with said gaseous mixture and raise the same to a fourth pressure, f. drive means interconnecting said recompressor and said super-expansion turbine for driving said recompressor from said super-expansion turbine, and g. a jet propulsion nozzle extending downstream of said recompressor to be supplied with said gaseous mixture issuing therefrom at said fourth pressure, and issue a thrust-producing jet.

2. Jet propulsion engine as claimed in claim 1, wherein said internal-combustion gas-turbine type gas generator in said fore unit further includes a shaft system interconnecting said compressor means and said turbine means for driving said compressor means from said turbine means, wherein said recompressor and super-expansion turbine interconnecting drive means in said aft unit is mechanically associated with and incorporated to said shaft system to form an integral aft extension thereof, and wherein said mechanical compression means in said fore unit is driven from said shaft system.

3. Jet propulsion engine as claimed in claim 2, wherein said gas generator includes compressor means having a low-pressure stage and a high-pressure stage, turbine means having a low-pressure stage and a high-pressure stage, and a shaft system having two coaxial shafts respectively interconnecting said low-pressure stages and said high-pressure stages to form two rotary spools in said gas generator, namely a low-pressure spool and a high-pressure spool, and wherein said recompressor, said super-expansion turbine and said mechanical compression means are incorporated to said low-pressure spool.

4. Jet propulsion engine as claimed in claim 1, wherein said internal-combustion gas-turbine type gas generator in said fore unit further includes a shaft system interconnecting said compressor means and said turbine means for driving said compressor means from said turbine means, wherein said recompressor and super-expansion turbine interconnecting drive means in said aft unit is mechanically independent from said shaft system to form a rotary entity separate and distinct from any rotary component of said gas generator.

5. Jet propulsion engine as claimed in claim 4, wherein said gas generator includes compressor means having a low-pressure stage and a high-pressure stage, turbine means having a low-pressure stage and a high-pressure stage, and a shaft system having to coaxial shafts respectively interconnecting said low-pressure stages and said high-pressure stages to form two rotary spools in said gas generator, namely a low-pressure spool and a high-pressure spool, and wherein said recompressor, said super-expansion turbine and said drive means interconnecting the same form together a third rotary spool mechanically independent from both said low-pressure spool and said high-pressure spool of said gas generator.

* * * * *